(12) United States Patent
Takahashi

(10) Patent No.: US 9,544,552 B2
(45) Date of Patent: Jan. 10, 2017

(54) PICKUP SYSTEM AND PICKUP METHOD

(75) Inventor: Masaki Takahashi, Kariya (JP)

(73) Assignee: Inspeedia Inc., Aichi (JP)

( * ) Notice: Subject to any disclaimer, the term of this patent is extended or adjusted under 35 U.S.C. 154(b) by 245 days.

(21) Appl. No.: 14/130,698

(22) PCT Filed: Jul. 5, 2012

(86) PCT No.: PCT/JP2012/004391
§ 371 (c)(1),
(2), (4) Date: Jan. 3, 2014

(87) PCT Pub. No.: WO2013/005445
PCT Pub. Date: Jan. 10, 2013

(65) Prior Publication Data
US 2014/0139654 A1 May 22, 2014

(30) Foreign Application Priority Data
Jul. 6, 2011 (JP) .................. 2011-150087

(51) Int. Cl.
G06Q 10/08 (2012.01)
H04N 7/18 (2006.01)
G06K 9/32 (2006.01)

(52) U.S. Cl.
CPC ............ H04N 7/185 (2013.01); G06K 9/3216 (2013.01); G06Q 10/08 (2013.01)

(58) Field of Classification Search
CPC ....... H04N 7/185; G06K 9/3216; G06Q 10/08
See application file for complete search history.

(56) References Cited

U.S. PATENT DOCUMENTS

| 5,898,161 A * | 4/1999 | DeVita | G04B 37/0016 235/462.44 |
| 2008/0131255 A1* | 6/2008 | Hessler | B65G 1/1378 414/788.1 |

(Continued)

FOREIGN PATENT DOCUMENTS

| JP | 7-44108 A | 2/1995 |
| JP | H0988218 A | 3/1997 |

(Continued)

OTHER PUBLICATIONS

The International Bureau of WIPO, "International Preliminary Report on Patentability," WIPO (Switzerland), Form PCT/IPEA/409, PCT/JP2012/004391, (Jan. 9, 2014).

*Primary Examiner* — Christopher Findley
(74) *Attorney, Agent, or Firm* — Hammer & Associates, P.C.

(57) ABSTRACT

Article specifying information for specifying articles collected in an article collection site is detected from an image captured by an imaging unit (101). When the article specifying information is detected, a position of the article in the article collection site are determined from the position of the article specifying information in the captured image, and article information in which the detected article specifying information is correlated with position information indicating the determined position of the articles is stored. The position information of a pickup target article corresponding to the article specifying information of the pickup target article is acquired with reference to the article information. A laser beam output unit (108) presents the position of the pickup target article to a pickup operator so as to recognize the presented position by irradiating the position of the pickup target article with a laser beam on the basis of the acquired position information.

9 Claims, 14 Drawing Sheets

(56) References Cited

U.S. PATENT DOCUMENTS

2010/0121480 A1* 5/2010 Stelzer .................. B65G 1/137
      700/215
2012/0323746 A1* 12/2012 Mountz ................ G06Q 10/087
      705/28

FOREIGN PATENT DOCUMENTS

| JP | 10-257475 A | 9/1998 |
| JP | H11349114 A | 12/1999 |
| JP | 2003034432 A | 2/2003 |
| JP | 4261583 B2 | 4/2009 |
| JP | 2009-541179 A | 11/2009 |
| WO | WO 2010044204 A1 | 4/2010 |

* cited by examiner

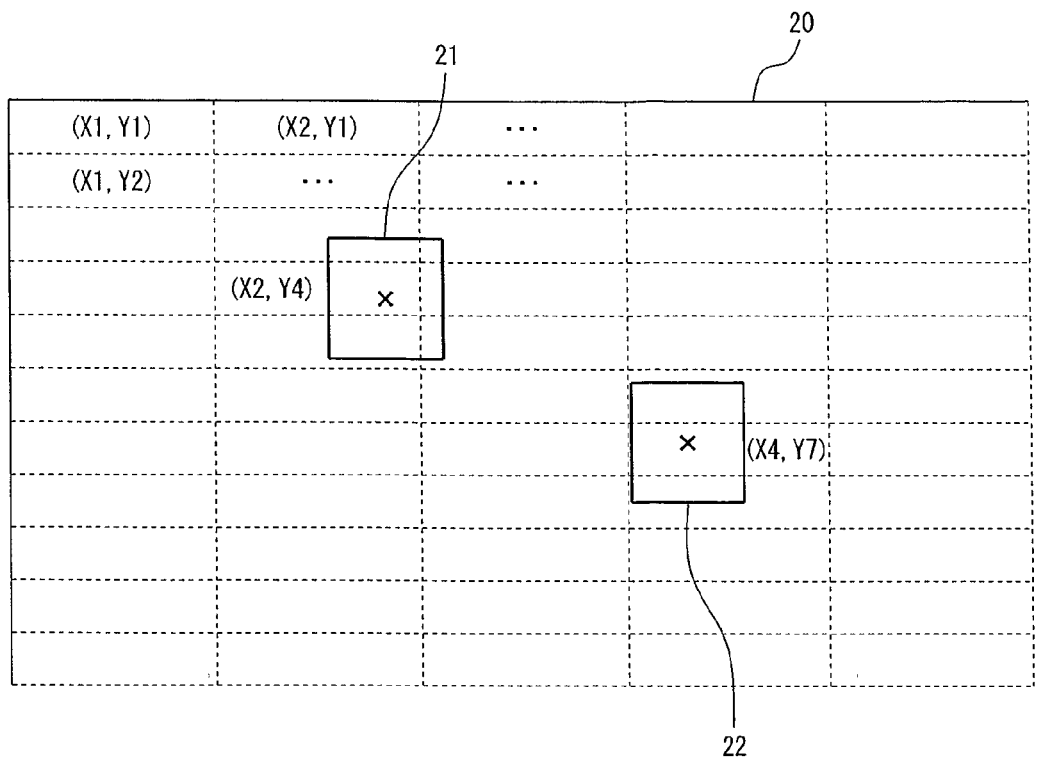

US 9,544,552 B2

PICKUP SYSTEM AND PICKUP METHOD

TECHNICAL FIELD

The present invention relates to a technique of detecting a pickup target article in a pickup operation in an article collection site such as a warehouse.

BACKGROUND ART

Conventionally, when an article to be picked up is found out in a site such as a warehouse in which plural articles are stored, an operator visually detects product names, product codes, or the like attached to articles. At this time, the operator performs a pickup operation with a memo, on which product names, product codes, and the like of articles to be picked up are written, in hand while looking at the memo. However, the method of performing a pickup operation while looking at the memo has problems in that the memo is erroneously read, the memo in hand hinders the pickup operation, and the like.

There is a method of checking whether an article is to be picked up while reading barcodes attached to articles with a barcode reader can be considered, but the operation of reading barcodes of articles with the barcode reader is troublesome and requires a lot of time.

To address the above problems, a speech picking system of transmitting product codes of articles to be picked up and the like to an operator by speech is known (for example, see PLT 1). According to the speech picking system, an operator can perform a pickup operation while listening to product codes and the like from a speaker of a headset mounted on the operator's head. Accordingly, since hands are free, the pickup operation can be facilitated and mistakes such as erroneous reading of product codes of articles can be reduced.

CITATION LIST

Patent Literature

PTL 1: Japanese Patent No. 4261583

SUMMARY OF INVENTION

Technical Problem

In the speech picking system described in PLT 1, since it is not necessary to read a memo or operate a barcode reader, it is possible to simplify the pickup operation. However, an operator has to visually find out an article indicated by speech and the finding of an article to be picked up out of plural articles stored in a warehouse needs a lot of labor and time.

The invention has been made in consideration of the above-mentioned circumstances, and an object of the present invention is to provide a pickup system and a pickup method which can allow an operator to easily pick up a target article in a warehouse or the like.

Solution to Problem

According to an aspect of the invention, there is provided a pickup system including: an imaging unit; an article specifying information detecting unit that detects article specifying information which is information for specifying an article collected in an article collection site from an image captured by the imaging unit; a position determining unit that determines a position of the article in the article collection site from the position of the article specifying information in the captured image when the article specifying information is detected; an article information storage unit that stores article information in which the detected article specifying information is correlated with position information indicating the determined position of the article; a pickup information storage unit that stores the article specifying information of a pickup target article; a position information acquiring unit that acquires the position information of the pickup target article corresponding to the article specifying information of the pickup target article from the article information stored in the article information storage unit; and a position presenting unit that visually presents the position of the pickup target article to a pickup operator on the basis of the acquired position information so as to cause the pickup operator to recognize that the pickup target article is to be picked up.

The pickup may further include a laser beam output unit that outputs a visible laser beam, and the position presenting unit may present the position of the pickup target article to the pickup operator by irradiating the pickup target article with the visible laser beam.

When the position of the article specifying information in the captured image departs from a predetermined area in the captured image, the position presenting unit may present the position of the pickup target article to the pickup operator by drawing a figure or a character indicating the position and the direction of the pickup target article with the visible laser beam instead of irradiating the pickup target article with the visible laser beam.

The pickup system may have a shape mountable on the pickup operator's head.

The imaging unit may capture the image to be captured in a direction identical to the pickup operator's directions of eyes.

The imaging unit may capture the image to be captured in a direction different from the pickup operator's directions of eyes, and the position determining unit may determine the position of the article on the basis of the imaging direction of the imaging unit and the position of the article specifying information in the captured image.

According to another aspect of the invention, there is provided a pickup system including an information terminal, a portable terminal communicating with the information terminal, and a pickup indicating device communicating with the portable terminal in a short-range radio communication manner, wherein the information terminal includes an article specifying information detecting unit that detects article specifying information which is information for specifying an article collected in an article collection site in a captured image transmitted from the pickup indicating device, a position determining unit that determines a position of the article in the article collection site from the position of the article specifying information in the captured image when the article specifying information is detected, an article information storage unit that stores article information in which the detected article specifying information is correlated with position information indicating the determined position of the article, a pickup information storage unit that stores the article specifying information of a pickup target article, a position information acquiring unit that acquires the position information of the pickup target article corresponding to the article specifying information of the pickup target article from the article information stored in the article information storage unit, and a first position information transmitting unit that transmits the acquired position information to the portable terminal, wherein the portable terminal is a terminal carried by a pickup operator and includes a position information storage unit that receives and stores the position information transmitted from the information terminal, and a second position information transmitting unit that transmits the position information stored in the position information storage unit to the pickup indicating device in the short-range radio communication manner, and wherein the pickup indicating device includes an imaging unit, a captured image transmitting unit that transmits an image captured by the imaging unit to the information terminal, and a position presenting unit that visually presents the position of the pickup target article to the pickup operator on the basis of the position information transmitted from the portable terminal so as to cause the pickup operator to recognize that the pickup target article is to be picked up.

According to still another aspect of the invention, there is provided a pickup method which is performed by a pickup system having an imaging unit, an article specifying information detecting unit, a position determining unit, an article information storage unit, a pickup information storage unit, a position information acquiring unit, a position information acquiring unit, and a position presenting unit, the pickup method including: a first step of causing the imaging unit to capture an image; a second step of causing the article specifying information detecting unit to detect article specifying information which is information for specifying an article collected in an article collection site from an image captured by the imaging unit; a third step of causing the position determining unit to determine a position of the article in the article collection site from position of the article specifying information in the captured image when the article specifying information is detected; a fourth step of causing the article information storage unit to store and hold article information in which the detected article specifying information is correlated with position information indicating the determined position of the article; a fifth step of causing the position information acquiring unit to read the article specifying information of a pickup target article from the pickup information storage unit; a sixth step of causing the position information acquiring unit to acquire the position information of the pickup target article corresponding to the read article specifying information of the pickup target article from the article information stored in the article information storage unit; and a seventh step of causing the position presenting unit to visually present the position of the pickup target article to a pickup operator on the basis of the acquired position information so as to cause the pickup operator to recognize that the pickup target article is to be picked up.

According to yet another aspect of the invention, there is provided a pickup system including: a pickup target article designating unit that designates a pickup target article of which a position in an article collection site is to be presented to a pickup operator out of articles collected in the article collection site; a position information output unit that outputs position information indicating a position of the designated pickup target article; and a position presenting unit that visually presents the position of the pickup target article to a pickup operator on the basis of the output position information so as to cause the pickup operator to recognize that the pickup target article is to be picked up.

Advantageous Effects of the Invention

According to the invention, since a pickup operator can easily pick up a target article in an article collection site such as a warehouse, it is possible to reduce a load of a pickup operation and thus to greatly shorten an operation time.

BRIEF DESCRIPTION OF DRAWINGS

FIG. 4 is a diagram illustrating a specific example of a method of detecting article specifying information and determining a position of the article specifying information;

FIG. 5 is a diagram illustrating a specific example of article information stored in an article information storage unit according to the first embodiment of the invention;

DESCRIPTION OF EMBODIMENTS

Figure 1A:
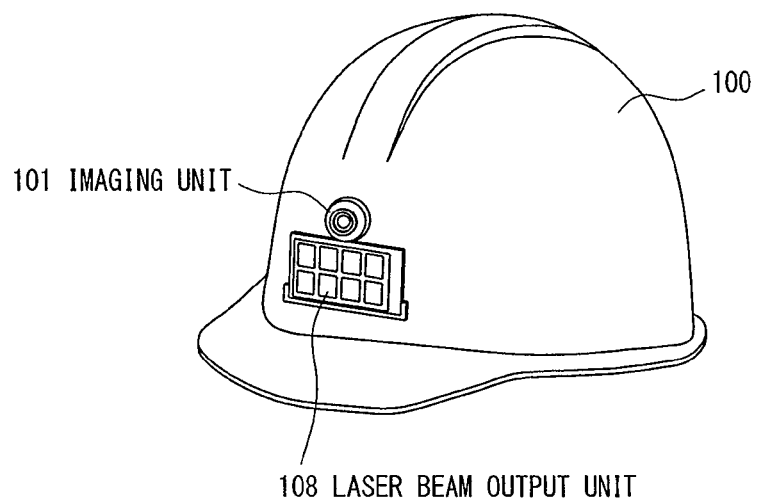
FIG. 1A and FIG. 1B are diagrams each schematically illustrating a pickup system according to a first embodiment of the invention.

Hereinafter, embodiments of the invention will be described with reference to the accompanying drawings. In the following embodiments, for example, it is assumed that a desired article is picked up from plural articles housed in a warehouse, but the invention is not limited to the above situation. The invention can be applied to various article collections sites as long as a specific article can be found out in the article collection sites having plural articles collected in the sites. For example, the invention can be applied to various situations in which a specific product should be found out in a store having plural products displayed in the store, in which a lot of vehicles are arranged in a harbor or the like and a vehicle to be transported should be found out and housed, etc.

In the drawings referred to in the following description, elements equivalent to those in the other drawings will be referenced by the same reference signs.

(First Embodiment)

(Outline of Pickup System)

First, the outline of a pickup system according to this embodiment will be described with reference to FIG. 1.

Figure 1B:
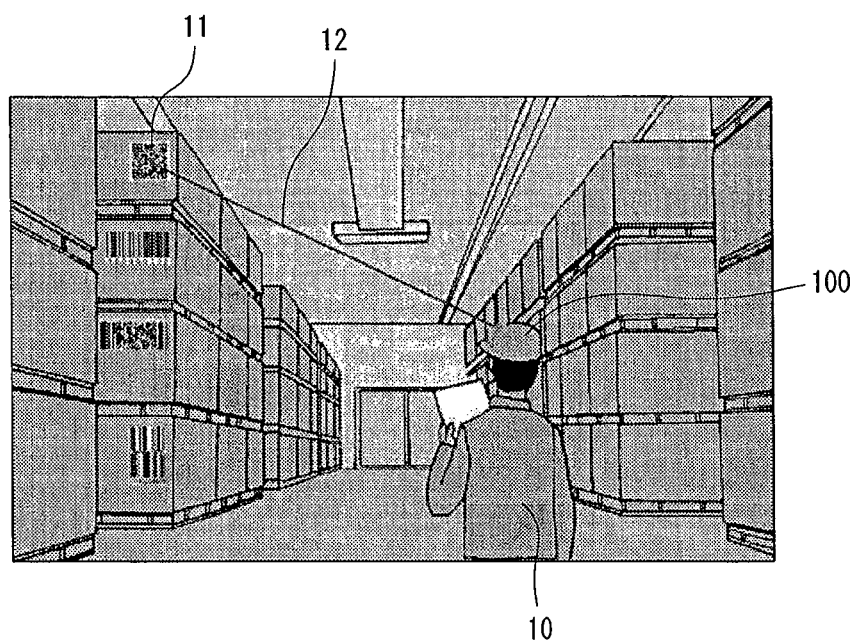

FIG. 1A is a diagram illustrating an appearance of a pickup assist device used in the pickup system according to this embodiment. A pickup assist device 100 has a helmet shape which can be mounted on a head of an operator performing a pickup operation. The pickup assist device 100 includes a camera (imaging unit) 101 that images the surroundings and a laser beam output unit 108 that irradiates an arbitrary location with a visible laser beam. As illustrated in FIG. 1B, an operator 10 performing a pickup operation has the helmet-type pickup assist device 100 mounted on the head of the operator when performing the pickup operation in a warehouse in which articles are housed. The imaging unit 101 is disposed on the front side of the helmet-type pickup assist device 100 and sequentially captures surrounding images in the same direction as the operator's directions of eyes in real time.

The pickup assist device 100 has an image processing function and checks whether a QR code (registered trademark), a barcode, a character code, or the like for specifying an article to be picked up is present in the image captured by the imaging unit 101. When the QR code or the like of an article 11 to be picked up is detected, the pickup assist device determines the position of the article 11 to be picked up from the position of the detected QR code or the like in the captured image. Then, as illustrated in FIG. 1B, a laser beam 12 is irradiated from the laser beam output unit 108 to the position of the article 11 to be picked up.

Accordingly, since an operator can simply see the position of the article to be picked up, the efficiency of the pickup operation in each stage is improved in comparison with a case where an article is found out while checking the QR code or the like with eyes.

(Configuration of Pickup Assist Device)

Hereinafter, a configuration example of the pickup assist device 100 according to this embodiment will be described with reference to FIG. 2.

Figure 2:
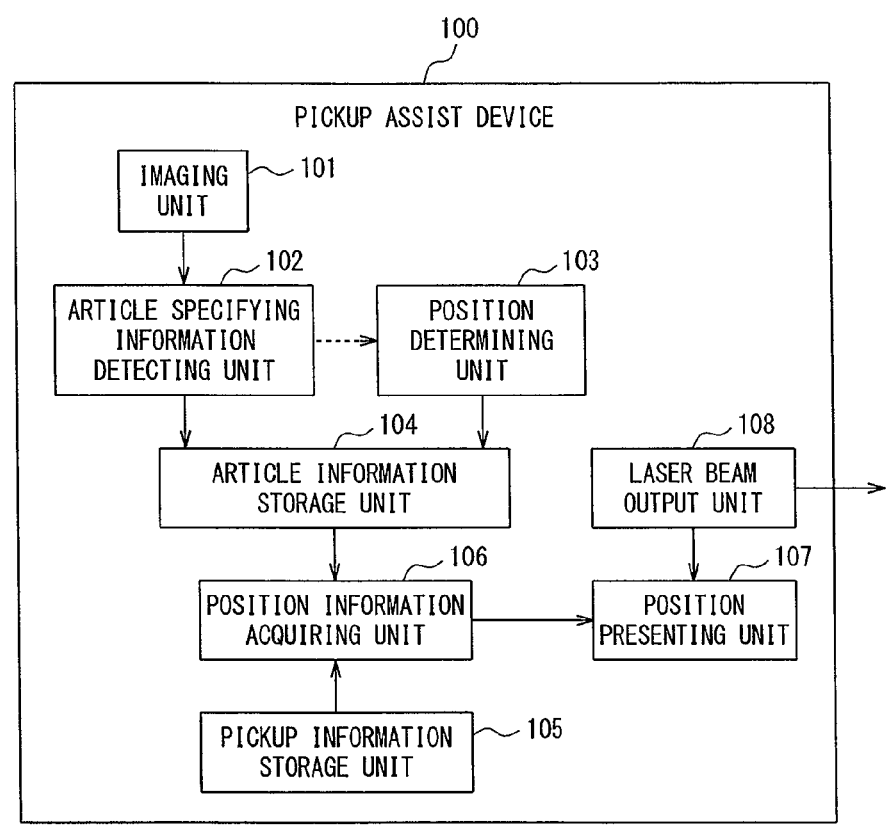
FIG. 2 is a functional block diagram illustrating an example of a configuration of a pickup assist device according to the first embodiment of the invention.

As illustrated in FIG. 2, the pickup assist device 100 includes an imaging unit 101, an article specifying information detecting unit 102, a position determining unit 103, an article information storage unit 104, a pickup information storage unit 105, a position information acquiring unit 106, a position presenting unit 107, and a laser beam output unit 108.

The imaging unit 101 captures an image in an article collection site in which articles are collected. In this embodiment, the imaging unit 101 captures an image in a warehouse. Image data of the image captured by the imaging unit 101 is stored in a memory such as a random access memory (RAM) in the pickup assist device 100.

The article specifying information detecting unit 102 detects article specifying information which is information for specifying an article collected in the article collection site from the captured image captured by the imaging unit 101. The article specifying information has only to uniquely identify an article. Examples include a QR code, a barcode, and a character string such as a product code or a product number. When articles have different article sizes, the article size may be employed as the article specifying information. When articles have different article shapes, different article colors, and the like, the article shapes, the article colors, and the like may be employed as the article specifying information. These plural types of information may be used as the article specifying information or a combination of these plural types of information may be used as the article specifying information. In this embodiment, it is assumed that the article specifying information is a QR code.

When the article specifying information is detected by the article specifying information detecting unit 102, the position determining unit 103 determines a position of an article in the article collection site from the position of the article specifying information in the captured image. Here, the "position of an article" is not limited to the position of the article itself, but the position of the article specifying information such as a QR code may be used as the position of the article. This is because it has only to provide a position in the article collection site at which the article to be picked up by a pickup operator is located, and if the position at which the article specifying information is in the article collection site can be seen, it means that the position of the article can be seen.

At the time of determining a position of an article, the position itself of the article specifying information in the captured image may be considered as the "position of the article", or the actual position of the article (or the article specifying information) in the site may be converted from the position of the article specifying information in the captured image and the conversion result may be considered as the "position of the article". The "position" may be a relative position (for example, a relative position of specifying information in the imaging direction in the captured image) or an absolute position (for example, an absolute position of specifying information in the captured image). In this embodiment, the absolute position of the article specifying information in the captured image is employed as the "position of an article".

Figure 3:
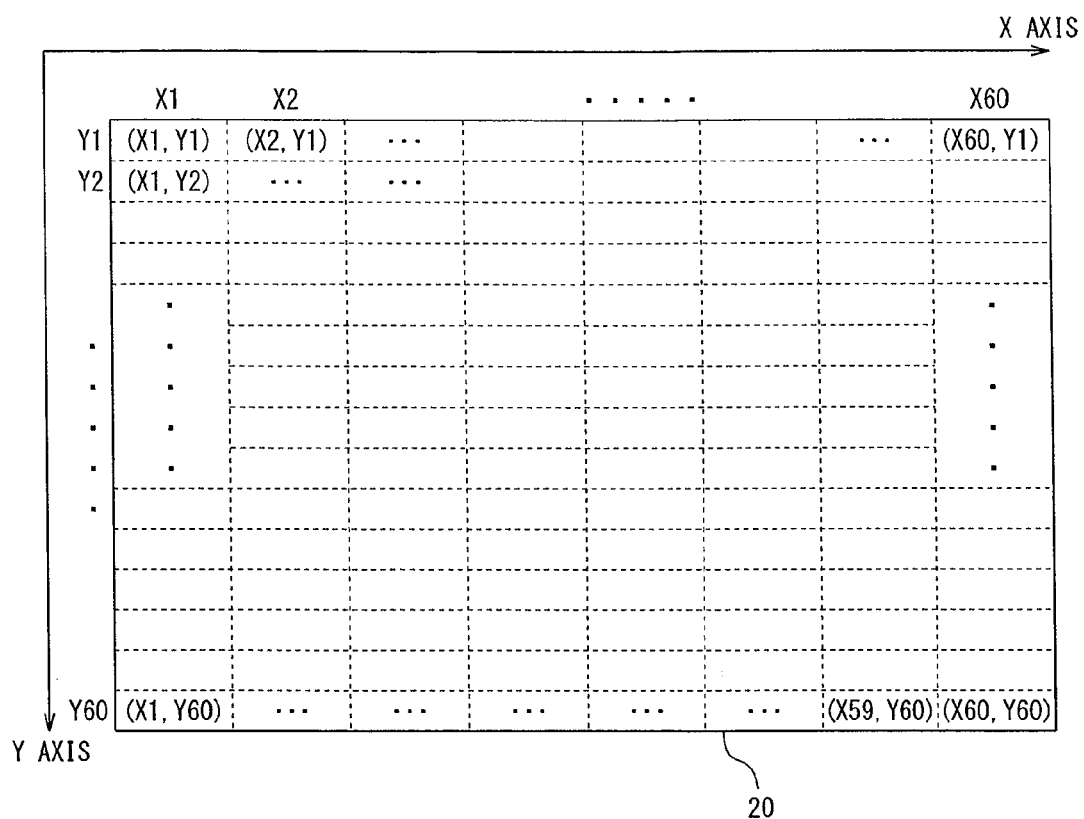
FIG. 3 is a diagram illustrating a specific example of a method of detecting article specifying information and determining a position of the article specifying information.

FIG. 3 is a diagram illustrating a specific example of a method of detecting article specifying information and determining a position of the article specifying information. For example, the article specifying information detecting unit 102 has an XY coordinate system with the width of a captured image 20 captured by the imaging unit 101 as an X axis and the length of the captured image 20 as a Y axis. In FIG. 3, the entire captured image 20 is divided into areas of width 60×length 60 and the areas are defined as (X1, Y1), (X1, Y2), . . . , (X60, Y60).

For example, as illustrated in FIG. 4, when QR codes (article specifying information) 21 and 22 are recognized from the captured image 20, it is determined in which area the centers of the QR codes 21 and 22 are located and the determined areas are recognized as the positions of the QR codes. In the example illustrated in FIG. 4, the position of the QR code 21 is (X2, Y4) and the position of the QR code 22 is (X4, Y7).

When the article specifying information is a character string, for example, the center position of a rectangle surrounding the entire character string may be set as the position of the article specifying information. When the article specifying information is an article size or an article shape, for example, the center position of a circle surrounding the entire article may be set as the position of the article specifying information.

In FIGS. 3 and 4, the position of the article specifying information is understood in a two dimension (XY coordinate system), but may be understood in a three dimension. For example, when the actual size of the article specifying information such as a QR code attached to each article is unified in a predetermined size, the distance by which the QR code or the like is spaced apart from the imaging unit 101 can be calculated depending on the actual size and the size of the QR code or the like in the captured image. Accordingly, the position in a depth direction in addition to the position of the article specifying information in the captured image (on a two-dimensional plane) can be understood.

The article information storage unit 104 stores article information in which the article information storage unit 104 detected by the article specifying information detecting unit 102 is correlated with position information indicating the position of the article determined by the position determining unit 103.

FIG. 5 is a diagram illustrating a specific example of the article information stored in the article information storage unit 104. As illustrated in FIG. 5, the article information storage unit 104 stores and holds the QR code (article specifying information) detected from the captured image and the position (article position) of the QR code in the captured image in a memory such as a RAM in the form of a database in correlation with each other.

Figure 6:
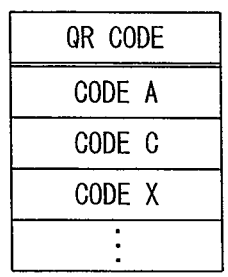
FIG. 6 is a diagram illustrating a specific example of article specifying information of a pickup target article stored in a pickup information storage unit according to the first embodiment of the invention.

The pickup information storage unit 105 stores the article specifying information of a pickup target article which is an article to be picked up. FIG. 6 is a diagram a specific example of the article specifying information of a pickup target article stored in the pickup information storage unit 105. In FIG. 6, "Code A", "Code C", and "Code X" are designated as the QR codes (article specifying information) of pickup target articles, which means that articles to which the QR codes of "Code A", "Code C", and "Code X" are attached are articles to be picked up.

The article specifying information of a pickup target article is stored in a memory such as a read only memory (ROM) or a RAM in the pickup assist device 100 of a helmet type in advance before performing the pickup operation.

The position information acquiring unit 106 acquires position information of a pickup target article corresponding to the article specifying information of the pickup target article from the article information stored in the article information storage unit 104. For example, in the example illustrated in FIGS. 5 and 6, the position information acquiring unit 106 reads the QR codes of "Code A", "Code C", and "Code X" designated in FIG. 6 and then acquires (X2, Y4), (X10, Y25), and (X48, Y11) as the positions of "Code A", "Code C", and "Code X" with reference to the article information illustrated in FIG. 5.

The position presenting unit 107 causes the pickup operator to recognize that the pickup target article should be picked up by visibly presenting the position of the pickup target article to the pickup operator (i.e., the user of the pickup assist device 100) on the basis of the position information acquired by the position information acquiring unit 106. In this embodiment, the position presenting unit 107 presents the position of the pickup target article to the pickup operator of the pickup assist device 100 using a visible laser beam output from the laser beam output unit 108, but the method of presenting the position of a pickup target article is not limited to this method. The position of a pickup target article may be presented using another method.

An example of the method of presenting the position of a pickup target article using a visible laser beam is a method of presenting the position of a pickup target article by irradiating the pickup target article with a laser beam as illustrated in FIG. 1B. In the example illustrated in FIGS. 5 and 6, the laser beam output unit 108 irradiates the coordinates (X2, Y4), (X10, Y25), and (X48, Y11), which are the positions of the QR codes "Code A", "Code C", and "Code X" acquired by the position information acquiring unit 106, with a laser beam. The laser beam output unit 108 has the same XY coordinate system as the article specifying information detecting unit 102 and tunes the laser irradiation position on the basis of the XY coordinates.

The visible laser beam from the laser beam output unit 108 may be irradiated to the article specifying information of the pickup target article or a portion of the pickup target article other than the article specifying information. For example, when sizes of outer cases of articles, positions of the QR codes or the like (article specifying information) on the outer cases, and directions in which the articles are displayed are identical, the position and the size of a region of the pickup target article other than the QR code on the outer case can be determined.

Figure 7:
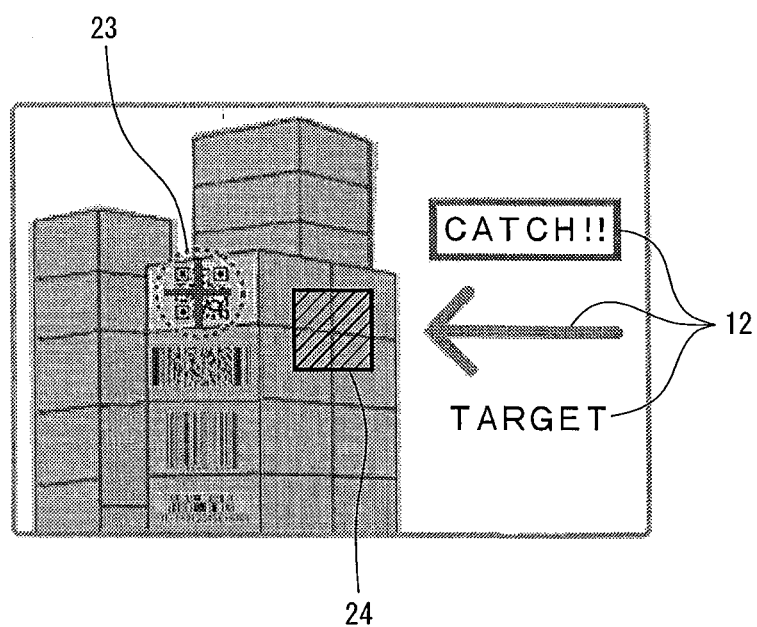
FIG. 7 is a diagram illustrating a specific example of a method of presenting a position of a pickup target article by the use of a position presenting unit according to the first embodiment of the invention.

In this embodiment, the imaging unit 101 is secured to the front surface of the helmet-type pickup assist device 100 and captures an image in the same direction as the directions of eyes of the pickup operator of the pickup assist device 100. Therefore, the captured image captured by the imaging unit 101 is substantially equivalent to the pickup operator's viewing field. Therefore, as illustrated in FIG. 7, when the position of the QR code 23 of the pickup target article in the captured image departs from a central area 24 of the captured image, the position of the pickup target article may be presented to the pickup operator by drawing a figure such as an arrow, a character (such as a character string indicating a direction), a line image copied by a line, or the like on a wall of a work place or the like with a laser beam 12 and indicating the direction of the QR code 23. Accordingly, the pickup operator can see that the pickup target article is present at a position departing in the direction indicated by the arrow or the like from the direction faced by the pickup operator.

The central area 24 may be set to be variable. Similarly, when the position of the QR code 23 of the pickup target article departs from a predetermined area other than the central area of the captured image, an arrow or a character may be drawn on the wall of the work place or the like with the laser beam 12 to indicate the direction of the QR code 23.

In an example of the method of controlling the output direction of a laser beam from the laser beam output unit 108, the output direction of a laser beam can be changed, for example, using a micro electromechanical system (MEMS) device. When a high-performance MEMS is used, a laser beam can be output in all directions as well as the predetermined direction.

(Process Flow in Pickup Assist Device)

Figure 8:
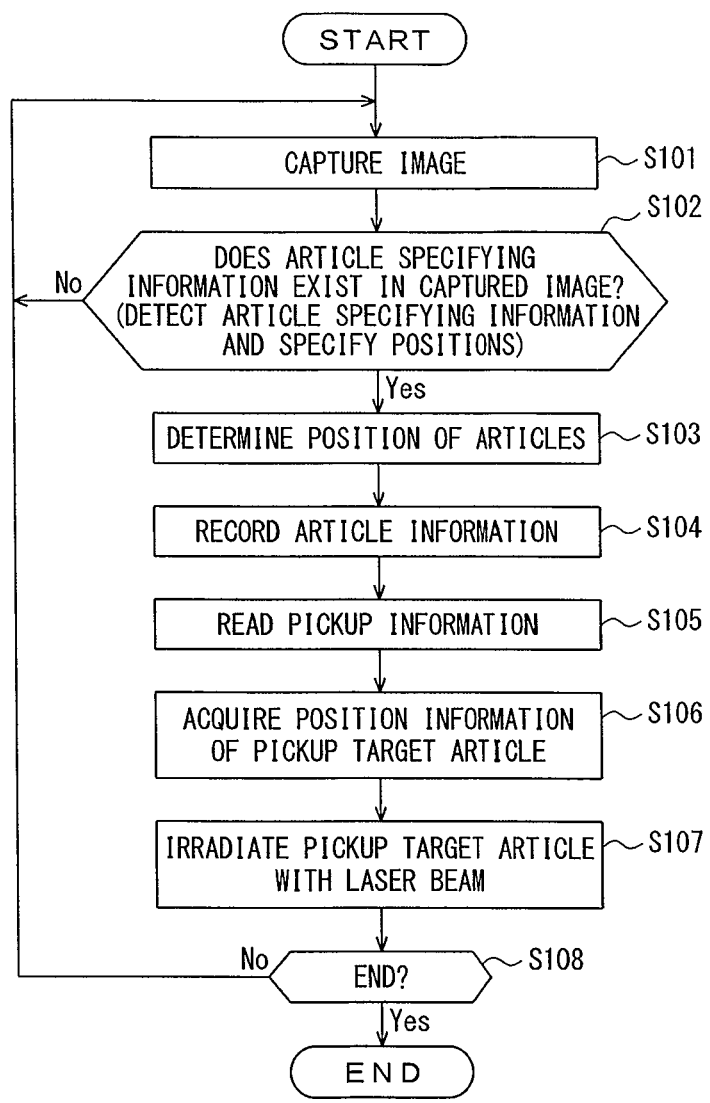
FIG. 8 is a flowchart illustrating an example of a process flow in the pickup assist device according to the first embodiment of the invention.

A process example in the pickup assist device 100 according to this embodiment will be described below with reference to the flowcharts illustrated in FIGS. 8 and 9.

(Process Flow 1)

First, the process flow illustrated in FIG. 8 will be described. FIG. 8 is a flowchart illustrating a process flow of an example where a position of an article is presented to a pickup operator by irradiating a pickup target article with a laser beam (FIG. 1B). The process flow in the pickup assist device 100 illustrated in FIG. 8 is repeatedly performed for every predetermined time interval (for example, every interval of several tens of milliseconds or in real time).

The imaging unit 101 captures an image around the pickup assist device 100 (step S101). The article specifying information detecting unit 102 determines whether article specifying information (a QR code or the like) is included in the captured image captured in step S101 (step S102). When article specifying information is not included in the captured image, the process of step S101 is repeated. When article specifying information is not included in the captured image, the laser beam output unit 108 may inform the pickup operator of the purport by drawing a character string such as "not detected" on the inner wall of the work place. Accordingly, the pickup operator can see that it is not necessary to change the imaging unit 101 of the pickup assist device 100 to another direction. When article specifying information is included in the captured image, the position of the article specifying information in the captured image is also detected in this step.

When article specifying information is included in the captured image, the position determining unit 103 determines a position of the corresponding article from the position of the article specifying information in the captured image (step S103). The position of an article determined herein may a position itself of the article specifying information (a QR code or the like) attached to the article detected in step S103 in the captured image or may be a position obtained by converting the position of the article specifying information in the captured image into the actual position of the article in the warehouse. The article information storage unit 104 stores and holds article information, in which the article specifying information specified in step S102 is correlated with the position of the article determined in step S103, in a storage device such as a memory (step S104).

The position information acquiring unit 106 reads pickup information stored in the pickup information storage unit 105 (step S105). Then, the position information acquiring unit acquires position the information corresponding to the article specifying information of a pickup target article included in the pickup information read in step S105 is acquired with reference to the article information stored in the storage device such as a memory in step S104 (step S106).

The position presenting unit 107 irradiates the pickup target article with a laser beam from the laser beam output unit 108 on the basis of the position information of the pickup target article acquired in step S106 (step S107).

For example, the above-mentioned process flow is repeatedly performed until the process flow ends with a reason why the power source of the pickup assist device 100 is turned off by the stop or end of the pickup operation, or the like (step S108).

(Process Flow 2)

The process flow illustrated in FIG. 9 will be described below. FIG. 9 is a flowchart illustrating a process flow of an example where a position of a pickup target article is presented to a pickup operator by drawing an arrow or the like on a work place with a laser beam (FIG. 7). The process flow in the pickup assist device 100 illustrated in FIG. 9 is repeatedly performed for every predetermined time interval (for example, every interval of several tens of milliseconds or in real time).

The imaging unit 101 captures an image around the pickup assist device 100 (step S201). The article specifying information detecting unit 102 determines whether article specifying information (a QR code or the like) is included in the captured image captured in step S201 (step S202). When article specifying information is not included in the captured image, the process of step S201 is repeated. When article specifying information is not included in the captured image, the laser beam output unit 108 may inform the pickup operator of the purport by drawing a character string such as "not detected" on the inner wall of the work place.

When article specifying information is included in the captured image, the position of the article specifying information in the captured image is also detected in this step. When article specifying information is included in the captured image, the position determining unit 103 determines the position of the article specifying information in the captured image as the position of the article.

The article information storage unit 104 stores and holds article information, in which the article specifying information specified in step S202 is correlated with the position of the article specifying information, in a storage device such as a memory (step S203).

The position information acquiring unit 106 reads pickup information stored in the pickup information storage unit 105 (step S204). Then, the position information acquiring unit acquires position the information corresponding to the article specifying information of a pickup target article included in the pickup information read in step S204 is acquired with reference to the article information stored in the storage device such as a memory in step S203 (step S205).

The position presenting unit 107 determines whether the article specifying information of the pickup target article acquired in step S205 is within a central area (for example, the central area 24 in FIG. 7) of the captured image (step S206). When the article specifying information of the pickup target article is not within the central area of the captured image, the position presenting unit 107 presents a direction (direction in which the pickup operator's directions of eyes should move) of the article specifying information of the pickup target article to the pickup operator by drawing an arrow or the like on the inner wall of the work place with a laser beam (step S207). When the article specifying information of the pickup target article is within the central area of the captured image, the position presenting unit 107 irradiates the pickup target article with a laser beam (step S208).

For example, the above-mentioned process flow is repeatedly performed until the process flow ends with a reason why the power source of the pickup assist device 100 is turned off by the stop or end of the pickup operation, or the like (step S209).

Figure 9:
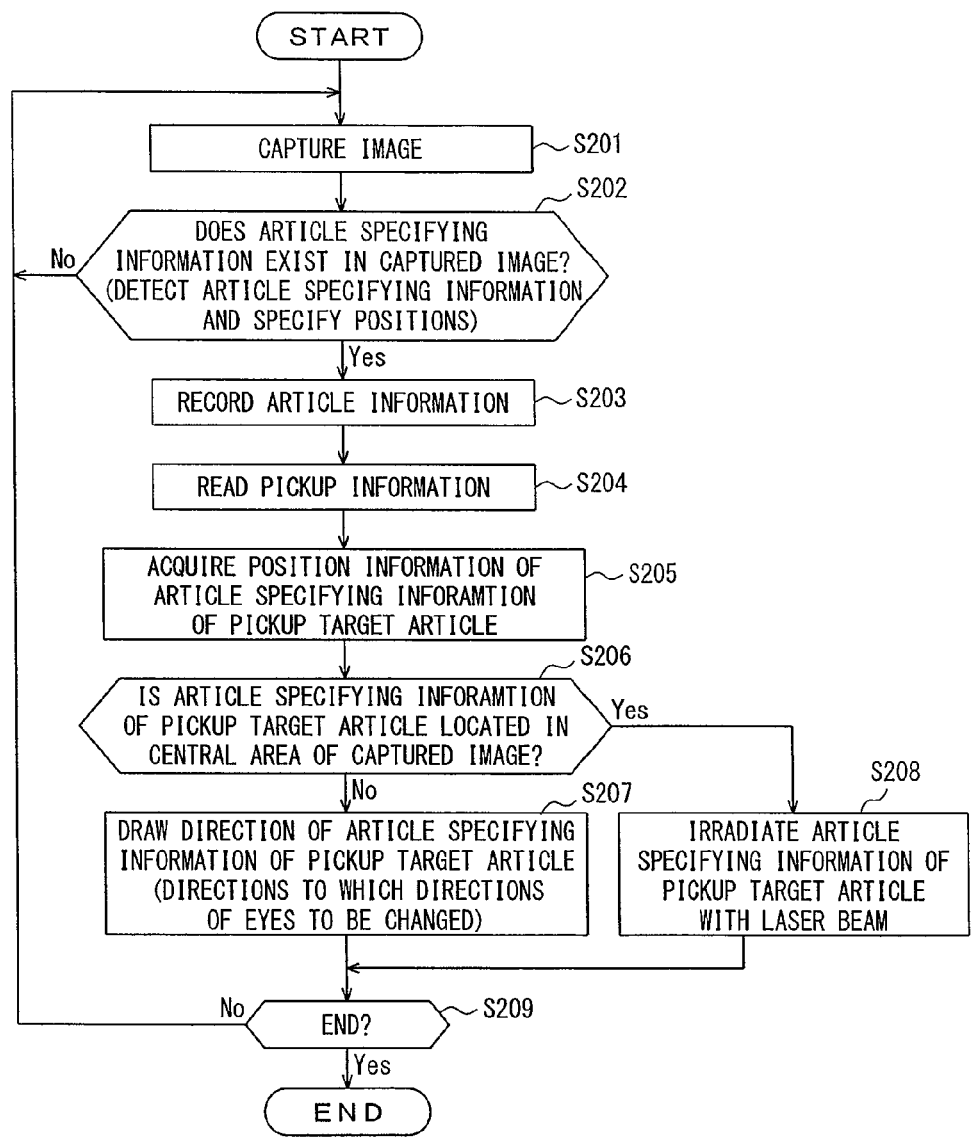
FIG. 9 is a flowchart illustrating an example of process flow in the pickup assist device according to the first embodiment of the invention.

The pickup method illustrated in FIG. 9 is effective in a case where the laser beam output unit 108 is secured to the front surface of the helmet-type pickup assist device 100. By employing this configuration, since a mechanism for changing the irradiation direction of a laser beam from the laser beam output unit 108 or the like is not necessary, the configuration of the pickup assist device 100 can be simplified to construct a system with a low cost. With this configuration, it is possible to satisfactorily achieve the advantageous effect of reducing a load of the pickup operation by the pickup operator.

(Other Specific Examples)

(1) In the above description, the imaging unit 101 is secured to the front surface of the helmet-type pickup assist device 100 and an image in the same direction as the directions of eyes of the pickup operator of the pickup assist device 100 is captured, but the invention is not limited to this configuration. An image in a direction different from the directions of eyes of the pickup operator of the pickup assist device 100 may be captured and the position determining unit 103 may determine the position of an article on the basis of the imaging direction of the imaging unit 101 and the position of the article specifying information in the captured image.

For example, instead of fixing the imaging unit 101 as illustrated in FIG. 1, the imaging unit 101 may be configured to circulate the outer circumference of the head mounting portion of the helmet-type pickup assist device 100 and a pickup operator having the pickup assist device 100 mounted on the operator's head may capture a surrounding image (for example, an image in a transverse direction or a back direction of the pickup operator). The imaging direction of the imaging unit 101 is not limited to these examples, but may be set to capture images in all directions. That is, articles present in all directions may be specified and the articles in all directions may be imaged to determine the positions of the corresponding articles.

A captured image and a rotation angle (imaging direction) of the imaging unit 101 when the captured image is captured are stored in correlation with each other, and the positions of articles, to which QR codes are attached, in a warehouse are calculated on the basis of the positions of the QR codes (article specifying information) in the captured image and the imaging direction of the imaging unit 101 when the captured image is captured. The article information storage unit 104 stores the calculated positions of the articles in the warehouse as the position information of the corresponding QR codes in the article information (FIG. 5). The position information acquiring unit 106 acquires the position of a pickup target article from the article information and the position presenting unit 107 presents the acquired position of the pickup target article to the pickup operator by irradiation with a laser beam or the like.

Accordingly, even when a pickup target article is present in a place which cannot be seen with the pickup operator's viewing field, the pickup operator can easily understand the position of the pickup target article by irradiation with a laser beam or the like and thus it is possible to greatly enhance efficiency of the pickup operation.

(2) In the above description, the constituent units of the pickup assist device 100 are incorporated into the helmet-type chassis, but the constituent units may be disposed in different devices. For example, a pickup operator carries a portable terminal such as a smart phone when performing a pickup operation and records pickup information in the portable terminal in advance (that is, the pickup information storage unit 105 is disposed in the portable terminal).

When the power source of the smart phone or the pickup assist device 100 is turned on in the work place, the pickup information may be automatically (manually) transmitted from a radio transmitter unit of Bluetooth (registered trademark) disposed in the smart phone to the pickup assist device 100. Accordingly, even when articles to be picked up are different depending on pickup operations, it is not necessary to record the pickup information every time on a memory disposed in the pickup assist device 100, and preparation of the pickup operation is simplified. Since the configuration of the pickup assist device 100 is also simplified, it is possible to achieve an advantageous effect of a decrease in cost.

(3) In the above description, since the pickup assist device 100 is of a helmet type mounted on a head of a pickup operator, the imaging unit 101 can image housed articles from angles of various directions with the movement of the pickup operator. For example, when the imaging unit 101 captures surrounding images while the pickup operator walks between display shelves, articles hidden in the display shelves which could not be imaged from a certain direction or the like can be imaged.

Here, the type of the pickup assist device 100 is not limited to the helmet type. For example, various types such as an eyeglass type, a headband type, and a wristwatch type can be employed. The pickup assist device 100 according to this embodiment may have a shape which can be attached to a pickup cart for transferring pickup target articles.

(Second Embodiment)
(Outline of Pickup System)

Figure 10:
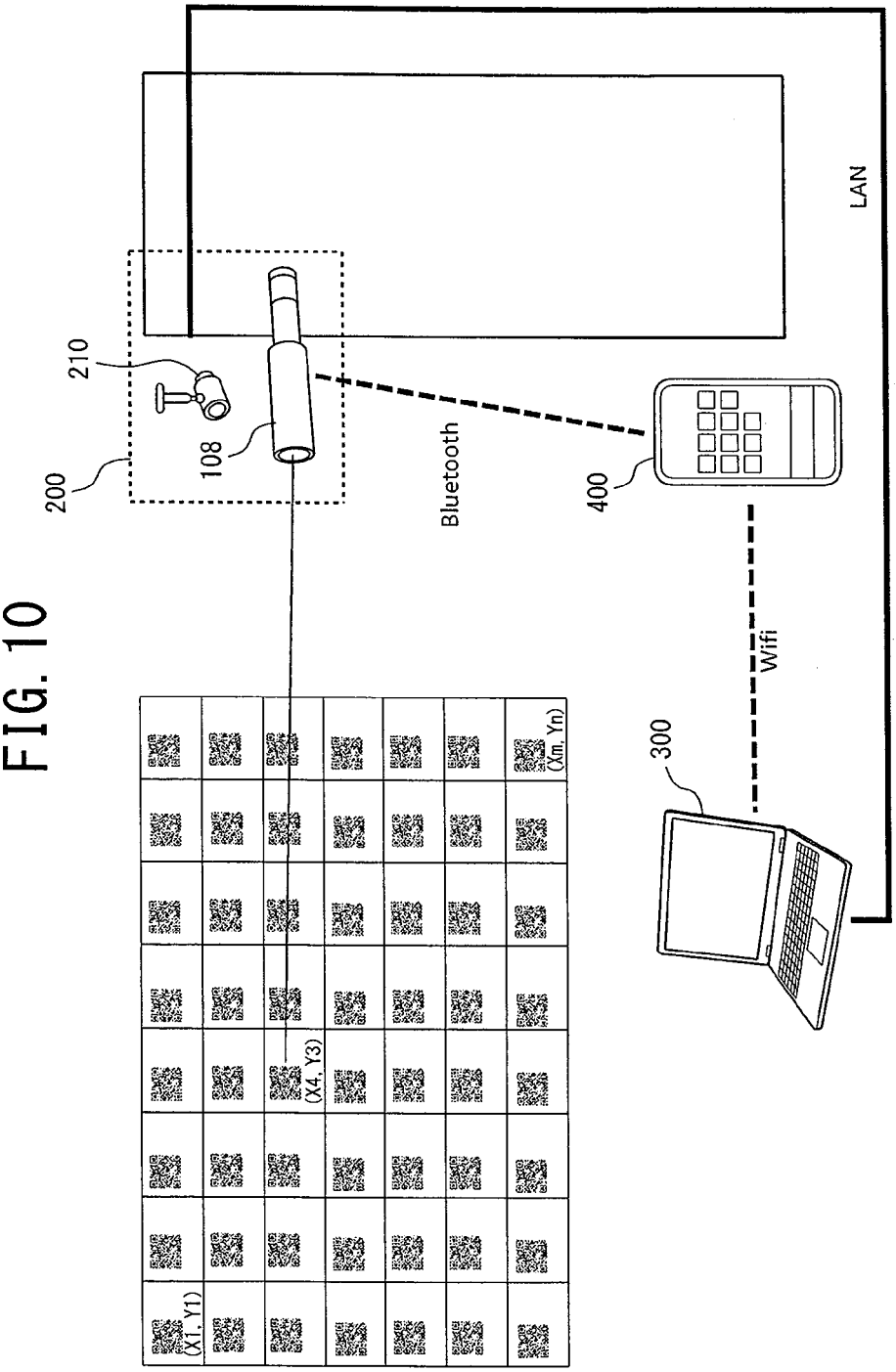
FIG. 10 is a diagram schematically illustrating a pickup system according to a second embodiment of the invention.

First, the outline of a pickup system according to this embodiment will be described with reference to FIG. 10.

The pickup system according to this embodiment includes a pickup indicating device 200, an information terminal 300, and a portable terminal 400. The pickup indicating device 200 is installed in a warehouse and includes a camera 210 capturing surrounding images in the warehouse and a laser beam output unit 108 irradiating a pickup target article with a laser beam.

The information terminal 300 receives a captured image captured by the camera 210 via a network such as a local area network (LAN), analyzes the image, and creates article information (FIG. 5). A pickup indicator operates the information terminal 300 to create pickup information of articles to be picked up. The information terminal 300 acquires position information of a pickup target article from the article information and the pickup information and transmits the acquired position information to the portable terminal 400.

The portable terminal 400 is a portable terminal such as a smart phone which is carried by a pickup operator for a pickup operation, receives the position information of pickup target articles from the information terminal 300 by radio communication such as wireless fidelity (Wifi) before the pickup operation, and stores the received position information in an internal memory or the like. When the pickup operator goes in a warehouse with the portable terminal 400 and the portable terminal 400 and the pickup indicating device 200 get close to each other within a predetermined distance, the position information of pickup target articles stored in the internal memory is automatically transmitted to the pickup indicating device 200 by short-range radio communication such as Bluetooth.

When the position information of the pickup target articles is received with the portable terminal 400 by short-range radio communication, the pickup indicating device 200 irradiates a pickup target article with a laser beam from the laser beam output unit 108 on the basis of the received position information and presents the position of the pickup target article to the pickup operator.

(Configuration of Pickup System)

Figure 11:
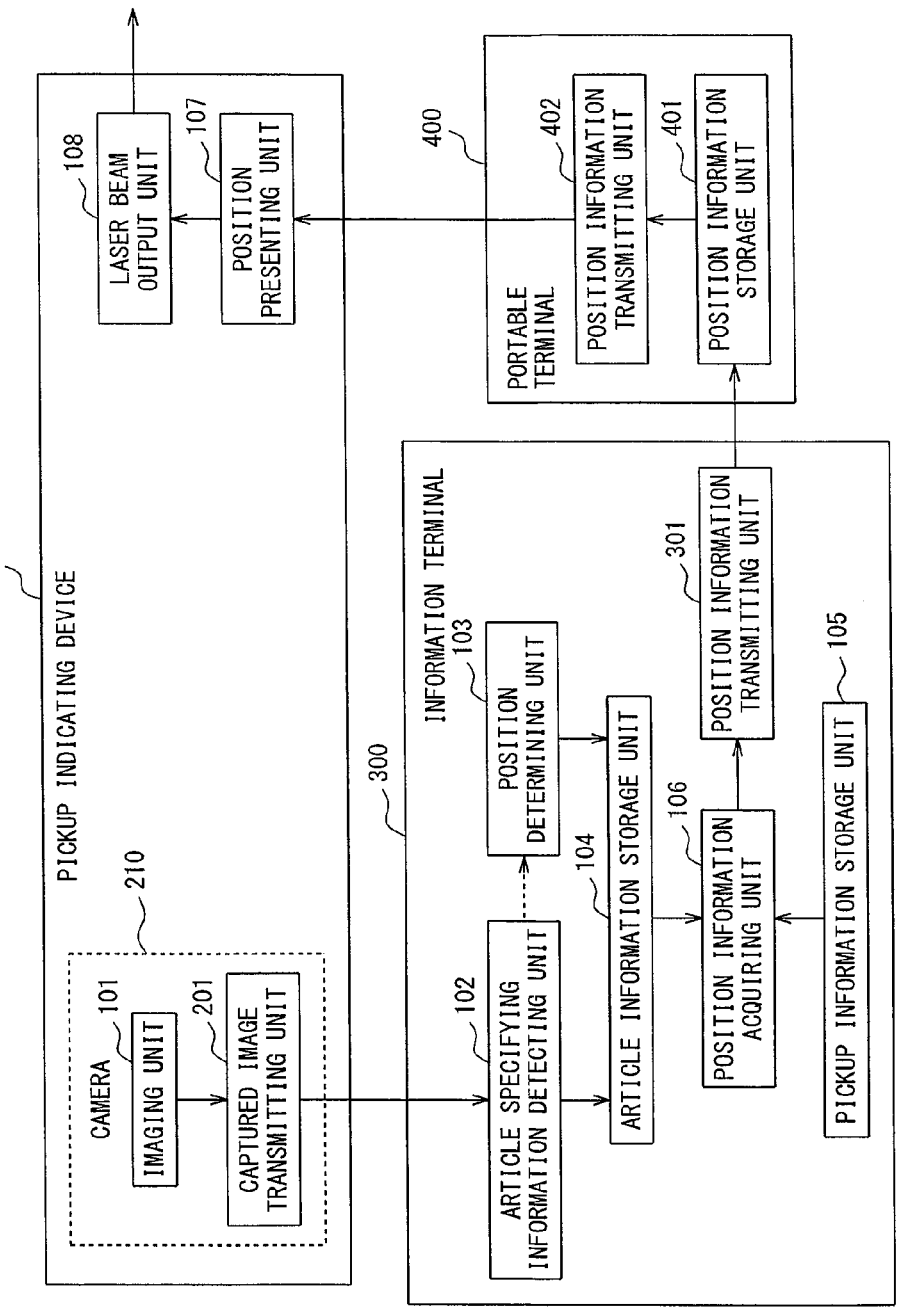
FIG. 11 is a functional block diagram illustrating an example of a configuration of the pickup system according to the second embodiment of the invention.

A configuration example of the pickup system according to this embodiment will be described below with reference to FIG. 11. In FIG. 11, the same elements as in the first embodiment are referenced by the same reference signs. The structures of article information, pickup information, and position information in the pickup system according to this embodiment are the same as in the first embodiment.

(Configuration of Pickup Indicating Device 200)

The pickup indicating device 200 includes a camera 210 having an imaging unit 101 and a captured image transmitting unit 201, a position presenting unit 107, and a laser beam output unit 108. Here, the elements of the captured image transmitting unit 201 are the same as in the first embodiment.

The captured image transmitting unit 201 transmits a captured image captured by the imaging unit 101 to the information terminal 300. In this embodiment, the captured image is transmitted to the information terminal 300 via a LAN, but the invention is not limited to this configuration. The article specifying information detecting unit 102 of the information terminal 300 receives the captured image transmitted from the pickup indicating device 200 and detects article specifying information which is information for specifying an article in the received captured image.

(Configuration of Information Terminal 300)

The information terminal 300 includes an article specifying information detecting unit 102, a position determining unit 103, an article information storage unit 104, a pickup information storage unit 105, a position information acquiring unit 106, and a position information transmitting unit 301. Here, the elements other than the position information transmitting unit 301 are the same as in the first embodiment.

The position information transmitting unit 301 transmits the position information acquired by the position information acquiring unit 106 to the portable terminal 400. In this embodiment, the position information is transmitted to the portable terminal 400 by Wifi, but the invention is not limited to this configuration. Radio communication methods such as infrared communication, Bluetooth, and radio LAN may be used.

The pickup indicator operates the information terminal 300 to input pickup information of articles to be picked up and thus the pickup information storage unit 105 stores the input pickup information. At this time, a graphical user interface (GUI) for displaying a list of article information (that is, a list of article specifying information of articles displayed in a warehouse) stored in the article information storage unit 104 may be displayed on a screen of the information terminal 300. Then, the pickup indicator may select an article to be picked up from the list of article information displayed in the GUI using an input device such as a touch panel, a keyboard, and a mouse, and may store the article specifying information of the selected article as pickup information. Accordingly, the pickup indicator can simply designate a pickup target article.

(Configuration of Portable Terminal 400)

The portable terminal 400 includes a position information storage unit 401 and a position information transmitting unit 402.

The position information storage unit 401 receives position information transmitted from the information terminal 300 and stores the received position information in a storage device such as an internal memory.

The position information transmitting unit 402 transmits the position information stored in the position information storage unit 401 to the pickup indicating device 200 by short-range radio communication. In this embodiment, the position information is transmitted to the pickup indicating device 200 by Bluetooth, but the invention is not limited to this configuration. Radio communication methods such as infrared communication, Bluetooth, and radio LAN may be used. The position information transmitting unit 402 may be configured to automatically start transmitting of position information, for example, when the distance between the portable terminal 400 and the pickup indicating device 200 becomes less than a predetermined distance.

The position presenting unit 107 of the pickup indicating device 200 receives the position information transmitted from the position information transmitting unit 402 of the portable terminal 400 and presents the position of the pickup target article to the pickup operator of the portable terminal 400 on the basis of the received position information.

(Process Flow in Pickup System)

Hereinafter, processing examples in the pickup system according to this embodiment will be described with reference to the flowcharts illustrated in FIGS. 12, 13, and 14.

(Process Flow of Camera 210)

Figure 12:
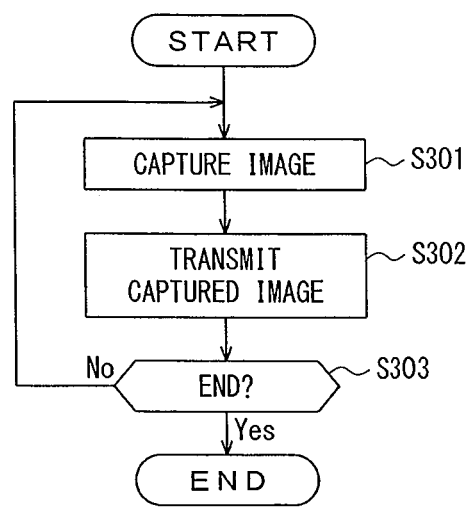
FIG. 12 is a flowchart illustrating an example of a process flow in a camera of a pickup indicating device according to the second embodiment of the invention.

FIG. 12 is a flowchart illustrating a process flow of the camera 210 of the pickup indicating device 200.

The imaging unit 101 captures an image around the pickup indicating device 200 (step S301). Then, the imaging unit transmits the captured image to the information terminal 300 via a network such as a LAN (step S302).

The above-mentioned processes are repeatedly performed until the process flow ends with a reason why the power source of the camera 210 is turned off, or the like (step S303).

The process flow in the camera 210 illustrated in FIG. 12 is repeatedly performed for every predetermined time interval. Specifically, the predetermined time interval can be preferably set to 5 minutes to 10 minutes, but is no limited to this time interval. For example, the process flow may be performed in real time (an image is captured in the unit of very short time). The camera 210 captures surrounding images for the purpose of understanding a state where articles are stored in a warehouse. Therefore, for example, the imaging process may be performed at short time intervals in a time zone in which articles stored in the warehouse are frequently input and output (the display state of articles is frequently changed), and the imaging process may be performed at long time intervals in a time zone in which articles are less frequently input and output. The imaging process may not be performed in a time zone in which articles are not input and output.

The imaging process may be performed only when a specific event occurs. For example, the imaging process may be performed at a timing desired by a warehouse manager.

The process of transmitting the captured image (step S302) may be performed at a specific timing. For example, when the imaging unit 101 captures surrounding images in the warehouse for every several tens of milliseconds or in real time (every very short time interval) and an image variation is detected due to input and output of articles by a moving object detecting process, the process of transmitting the captured image (step S302) may be performed. Accordingly, it is possible to suppress a processing load and to accurately understand a display situation of necessary articles.

(Process Flow of Information Terminal 300)

FIG. 13 is a flowchart illustrating a process flow which is performed by the information terminal 300.

Figure 13A:
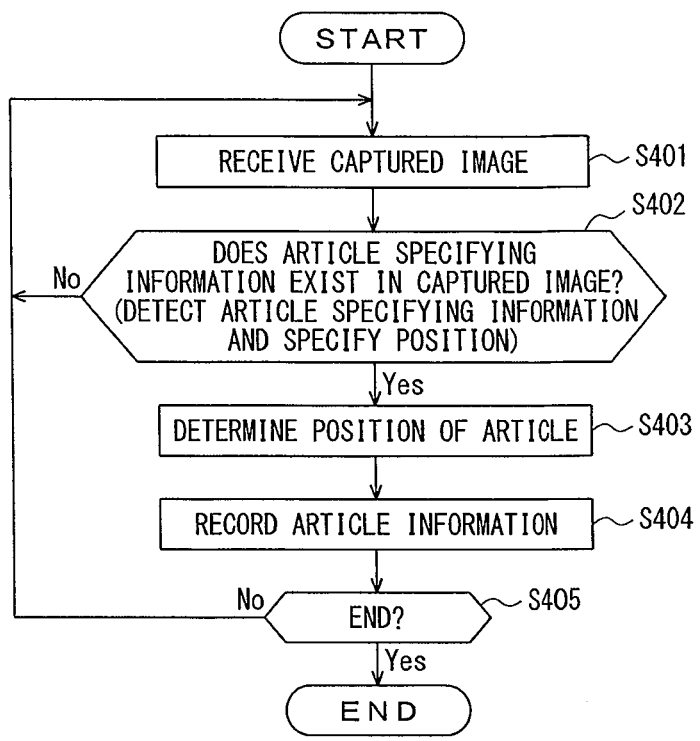
FIG. 13A and FIG. 13B are flowcharts each illustrating an example of a process flow in an information terminal according to the second embodiment of the invention.

First, the flowchart illustrated in FIG. 13A will be described. The process flow illustrated in FIG. 13A is a process flow which is performed whenever a captured image is transmitted from the camera 210.

The article specifying information detecting unit 102 receives the captured image transmitted from the captured image transmitting unit 201 of the camera 210 and determines whether article specifying information (a QR code or the like) is included in the received captured image (step S401). When article specifying information is not included in the captured image, the process of step S401 is repeated. When article specifying information is included in the captured image, the position of the article specifying information in the captured image is also detected in this step.

When article specifying information is included in the captured image, the position determining unit 103 determines a position of the corresponding article from the position of the article specifying information in the captured image (step S403). The position of an article determined herein may a position itself of the article specifying information (a QR code or the like) attached to the article detected in step S403 in the captured image or may be a position obtained by converting the position of the article specifying information in the captured image into the actual position of the article in the warehouse. The article information storage unit 104 stores and holds article information, in which the article specifying information specified in step S402 is correlated with the position of the article determined in step S403, in a storage device such as a memory (step S404).

For example, the above-mentioned process flow is repeatedly performed until the process flow ends with a reason why the power source of the information terminal 300 is turned off (step S405). Accordingly, newest article information is always stored in the information terminal 300.

The flowchart illustrated in FIG. 13B will be described below. The process flow illustrated in FIG. 13B is a process flow which is performed when performing a pickup operation.

The position information acquiring unit 106 reads pickup information stored in the pickup information storage unit 105 (step S411). For example, the pickup information is input to the information terminal 300 by a pickup indicator or a pickup operator and the input pickup information is stored in an internal memory or the like of the information terminal 300. Then, the position information acquiring unit acquires the position information corresponding to the article specifying information of a pickup target article included in the pickup information read in step S411 with reference to the article information stored in the storage device such as a memory in step S404 of FIG. 13A (step S412).

The position information transmitting unit 301 transmits the position information of the pickup target article acquired in step S412 to the portable terminal 400 (step S413).

Figure 13B:
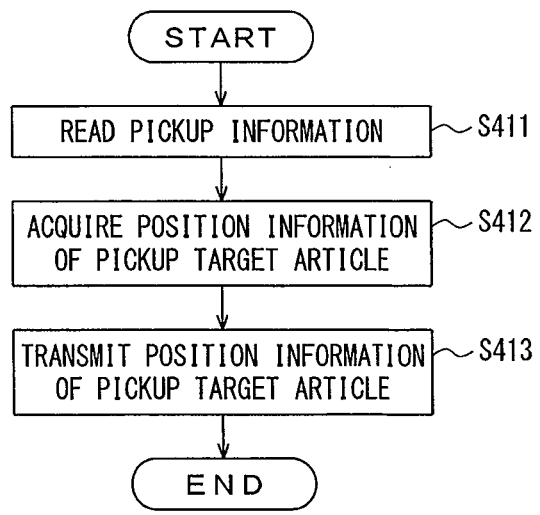

Specifically, the timing at which the process flow illustrated in FIG. 13B is, for example, just before a pickup operator starts the pickup operation. That is, the processes of steps S411 to S413 are performed after an article to be picked up is determined and input to the information terminal 300, and then the pickup operator carries the portable terminal 400 storing the transmitted position information of the pickup target article and performs the pickup operation in the warehouse.

(Process Flow of Portable Terminal 400)

Figure 14:
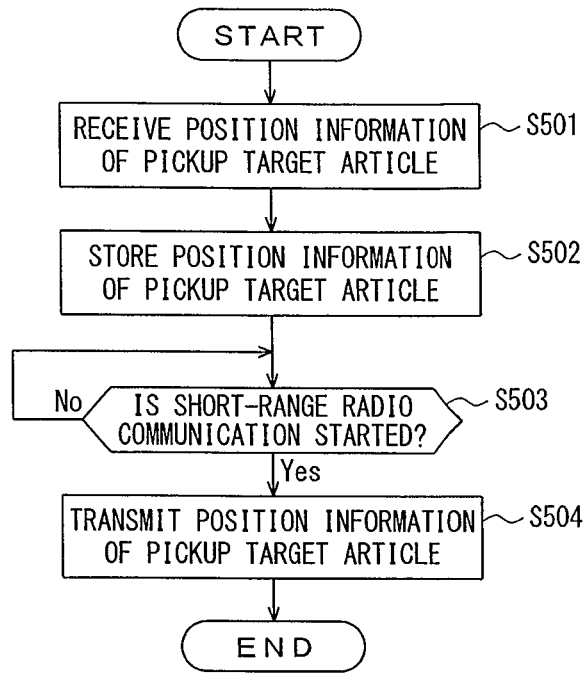
FIG. 14 is a flowchart illustrating an example of a process flow in a portable terminal according to the second embodiment of the invention.

FIG. 14 is a flowchart illustrating a process flow which is performed by the portable terminal 400.

The position information storage unit 401 receives position information of a pickup target article transmitted from the information terminal 300 (step S501). The position information storage unit stores the received position information in an internal memory or the like of the portable terminal 400 (step S502).

When the distance between the portable terminal 400 and the pickup indicating device 200 becomes less than a predetermined distance or short-range radio communication with the pickup indicating device 200 is started in response to an instruction to perform pickup (step S503), the position information of the pickup target article stored in step S504 is transmitted to the pickup indicating device 200 (step S504).

(Process Flow of Pickup Indicating Device 200)

Figure 15:
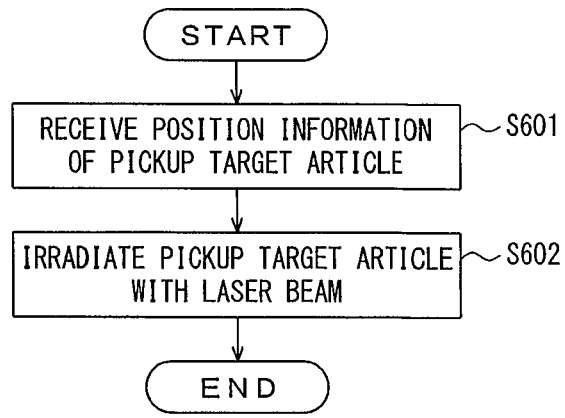
FIG. 15 is a flowchart illustrating an example of a process flow in the pickup indicating device according to the second embodiment of the invention.

FIG. 15 is a flowchart illustrating a process flow which is performed by the pickup indicating device 200 having received the position information of a pickup target article from the portable terminal 400.

The position presenting unit 107 receives the position information of the pickup target article from the portable terminal 400 (step S601). The laser beam output unit 108 irradiates the pickup target article (or the article specifying information of the pickup target article) on the basis of the received position information (step S602).

In the above description, the process flow of creating and storing the article information illustrated in FIG. 13A is performed by the information terminal 300, but may be performed by the camera 210. The article information created by the camera 210 may be transmitted to the information terminal 300.

(Third Embodiment)
(Outline of Pickup System)

Figure 16:
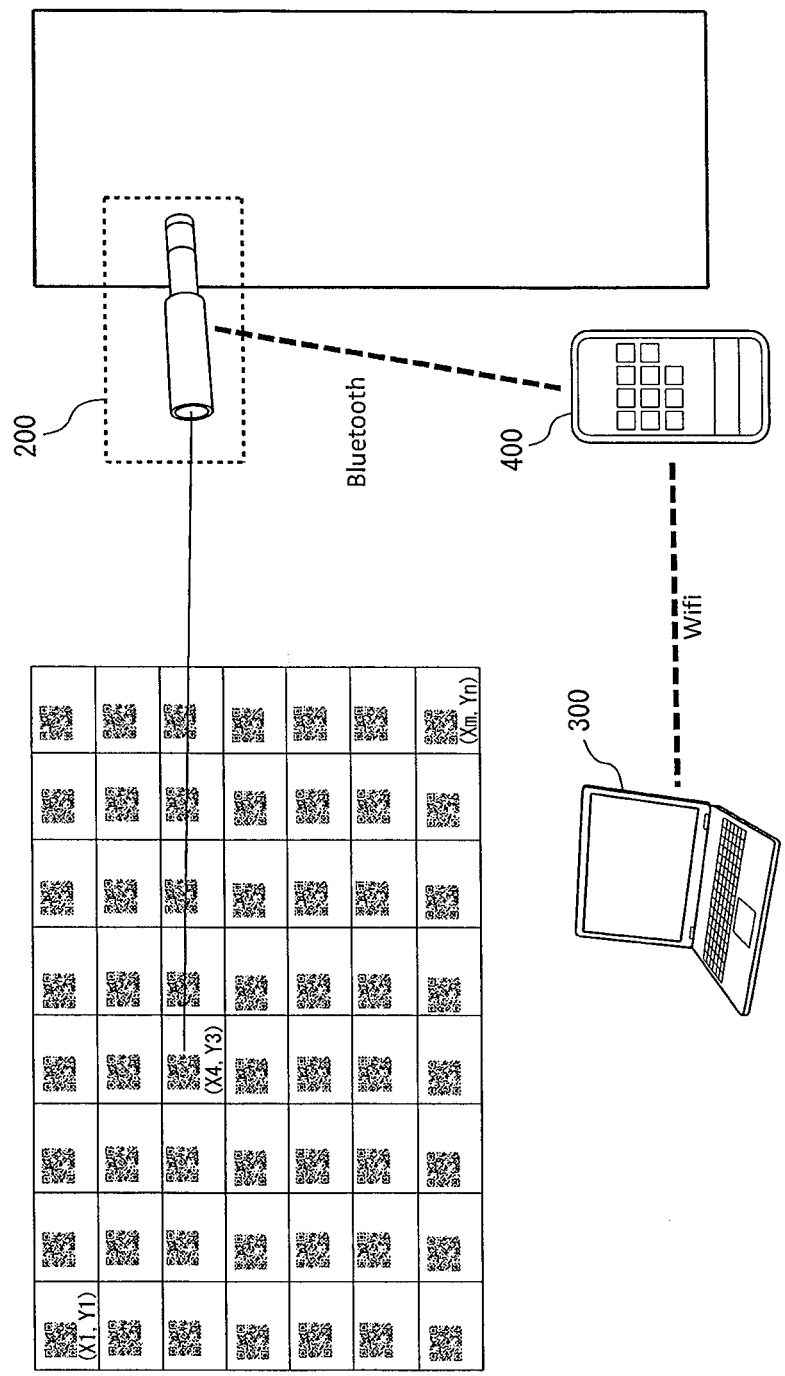
FIG. 16 is a diagram schematically illustrating a pickup system according to a third embodiment of the invention.

First, the outline of a pickup system according to this embodiment will be described with reference to FIG. 16.

The pickup system according to this embodiment includes a pickup indicating device 200, an information terminal 300, and a portable terminal 400, similarly to the second embodiment. This embodiment is different from the second embodiment, in that the process of capturing a surrounding image in a warehouse is not performed. For example, it is assumed that a pickup indicator knows the positions at which pickup target articles to be picked up are displayed in advance.

(Configuration of Pickup System)

Figure 17:
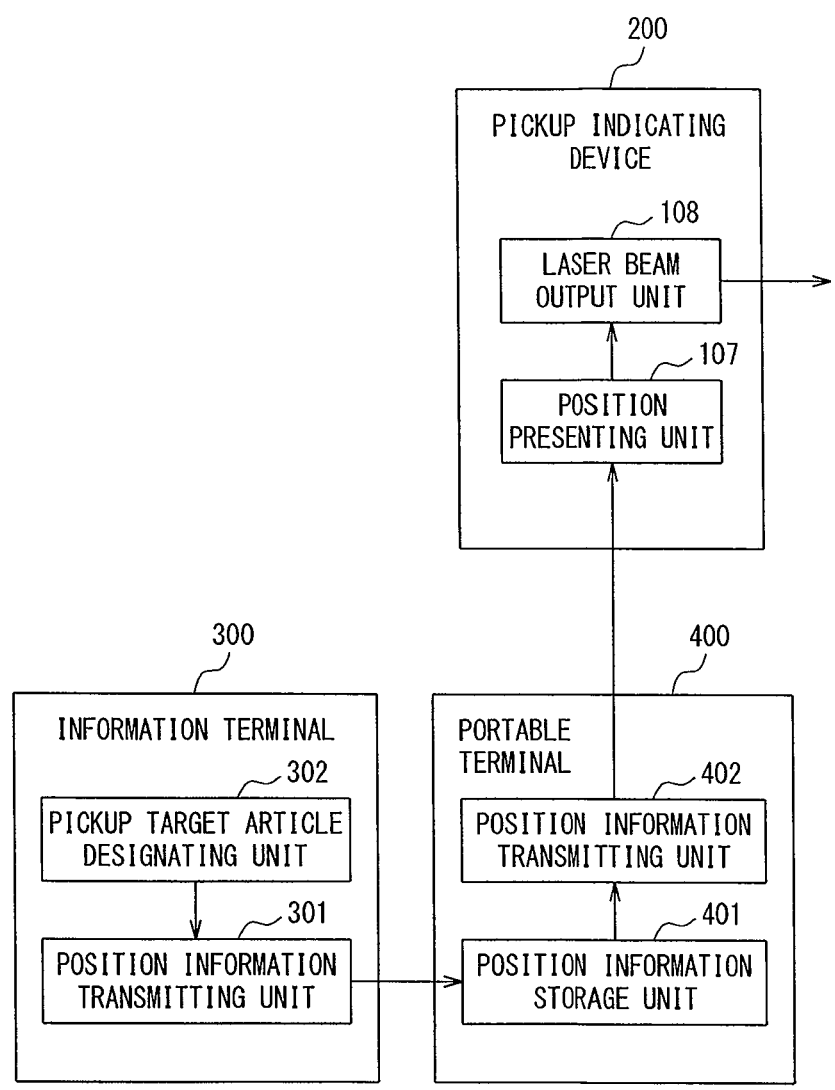
FIG. 17 is a functional block diagram illustrating an example of a configuration of the pickup system according to the third embodiment of the invention.

FIG. 17 is a diagram illustrating a configuration example of the pickup system according to this embodiment. In FIG. 17, the same elements as in the second embodiment are referenced by the same reference signs. The structures of the position information and the like in the pickup system according to this embodiment are the same as in the first embodiment.

In the pickup system according to this embodiment, position information of pickup target articles are stored in advance in the memory or the like of the information terminal 300, and is transmitted from the position information transmitting unit 301 to the position information storage unit 401 of the portable terminal 400. The pickup target articles are determined, for example, by causing a pickup indicator to designate and input the pickup target articles using an input device such as a mouse through a dedicated GUI or the like and causing the pickup target article designating unit 302 to receive the user's input.

That is, through the above-mentioned processes, the pickup target article designating unit 302 designates a pickup target article of which the position in an article collection site such as a warehouse should be presented to the pickup operator out of the articles collected in the article collection site. Then, the position information of the pickup target article designated by the pickup target article designating unit 302 is read from the memory of the information terminal 300 or the like. The read position information is transmitted from the position information transmitting unit 402 of the portable terminal 400 to the pickup indicating device 200.

The position presenting unit 107 of the pickup indicating device 200 presents the position of the pickup target article to the pickup operator by irradiating the position of the pickup target article, indicated by the position information transmitted from the portable terminal 400, with a laser beam from the laser beam output unit 108.

The units of the pickup system described in the above-mentioned embodiments are embodied by the same elements as general computer elements such as a central processing unit (CPU) (not illustrated), a storage device such as a RAM and a ROM, and a network interface. The above-mentioned functions of the elements are realized, for example, by causing the CPU to read and execute a program stored in the storage device. The article information storage unit 104, the pickup information storage unit 105, and the position information storage unit 401 are memory areas installed in the storage device such as a memory and store and hold the corresponding information in the form of a database.

(Conclusion)

As described above, according to the embodiments of the invention, it is possible to easily pick up a target article in an article collection site such as a warehouse, to reduce a load of a pickup operation, and thus to greatly shorten work time. Even an operator poor at the pickup operation can easily perform the pickup operation.

The scope of the invention is not limited to the exemplary embodiments illustrated and described above, but includes all embodiments which can achieve advantageous effects equivalent to the object of the invention. The scope of the invention may include all desired combinations of specific features of features disclosed herein.

The invention claimed is:

1. A pickup system comprising:
   an imaging unit that captures an image;
   an article specifying information detecting unit that detects article specifying information which is information for specifying articles collected in an article collection site from the image captured by the imaging unit;
   a position determining unit that determines a position of an article in the article collection site from the position of the article specifying information in the captured image when the article specifying information is detected;
   an article information storage unit that stores article information in which the detected article specifying information is correlated with position information indicating the determined position of the article;
   a pickup information storage unit that stores the article specifying information of a pickup target article;
   a position information acquiring unit that acquires the position information of the pickup target article corresponding to the article specifying information of the pickup target article from the article information stored in the article information storage unit, when the article specifying information detecting unit detects the article specifying information of the pickup target article in the image captured by the imaging unit;
   a laser beam output unit that outputs a visible laser beam; and
   a position presenting unit that visually presents the position of the pickup target article to a pickup operator on the basis of the acquired position information of the pickup target article by irradiating the pickup target article with the visible laser beam output from the laser beam output unit to cause the pickup operator to recognize that the pickup target article is to be picked up,
   wherein when the position of the article specifying information in the captured image departs from a predetermined area in the captured image, the position presenting unit presents the position of the pickup target article to the pickup operator by drawing a figure or a character indicating the position and the direction of the pickup target article with the visible laser beam instead of irradiating the pickup target article with the visible laser beam.

2. The pickup system according to claim 1, wherein the imaging unit, the article specifying information detecting unit, the position determining unit, the article information storage unit, the pickup information storage unit, the position information acquiring unit, the position presenting unit, and the laser beam output unit are disposed in a shape which is mountable on the pickup operator's head.

3. The pickup system according to claim 1, wherein the imaging unit captures the captured image in a direction identical to the pickup operator's eye line.

4. The pickup system according to claim 1, wherein the imaging unit captures the captured image in a direction different from the pickup operator's eye line, and
   wherein the position determining unit determines the position of the article on the basis of the imaging direction of the imaging unit and the position of the article specifying information in the captured image.

5. A pickup system comprising an information terminal, a portable terminal communicating with the information terminal, and a pickup indicating device communicating with the portable terminal in a short-range radio communication manner,
   wherein the pickup indicating device includes:
      an imaging unit that captures an image;
      a captured image transmitting unit that transmits the image captured by the imaging unit to the information terminal;
      a position presenting unit that visually presents the position of a pickup target article; and
      a laser beam output unit that outputs a visible laser beam,
   wherein the information terminal includes:
      an article specifying information detecting unit that detects article specifying information which is information for specifying an article collected in an article collection site in a captured image transmitted from the pickup indicating device;
      a position determining unit that determines a position of the article in the article collection site from the position of the article specifying information in the captured image when the article specifying information is detected;
      an article information storage unit that stores article information in which the detected article specifying information is correlated with position information indicating the determined position of the article;
      a pickup information storage unit that stores the article specifying information of the pickup target article;
      a position information acquiring unit that acquires the position information of the pickup target article corresponding to the article specifying information of the pickup target article from the article information stored in the article information storage unit, when the article specifying information detecting unit detects the article specifying information of the pickup target article in the image captured by the imaging unit; and
      a first position information transmitting unit that transmits the acquired position information to the portable terminal, wherein the portable terminal is a terminal carried by a pickup operator and includes:
a position information storage unit that receives and stores the position information transmitted from the information terminal; and
a second position information transmitting unit that transmits the position information stored in the position information storage unit to the pickup indicating device in a short-range radio communication manner, and
wherein the position presenting unit that visually presents the position of the pickup target article to the pickup operator on the basis of the position information of the pickup target article transmitted from the portable terminal by irradiating the pickup target article with the visible laser beam output from the laser beam output unit to cause the pickup operator to recognize that the pickup target article is to be picked up, and
wherein when the position of the article specifying information in the captured image departs from a predetermined area in the captured image, the position presenting unit presents the position of the pickup target article to the pickup operator by drawing a figure or a character indicating the position and the direction of the pickup target article with the visible laser beam instead of irradiating the pickup target article with the visible laser beam.

6. The pickup system according to claim 1, wherein the imaging unit, the article specifying information detecting unit, the position determining unit, the article information storage unit, the pickup information storage unit, the position information acquiring unit, the position presenting unit, and the laser beam output unit are disposed in a shape which is mountable on the pickup operator's head.

7. A pickup system comprising:
an imaging unit that captures an image;
an article specifying information detecting unit that detects article specifying information which is information for specifying articles collected in an article collection site from the image captured by the imaging unit;
a position determining unit that determines a position of an article in the article collection site from the position of the article specifying information in the captured image when the article specifying information is detected;
an article information storage unit that stores article information in which the detected article specifying information is correlated with position information indicating the determined the position of the article;
a pickup information storage unit that stores the article specifying information of a pickup target article;
a position information acquiring unit that acquires the position information of the pickup target article corresponding to the article specifying information of the pickup target article from the article information stored in the article information storage unit, when the article specifying information detecting unit detects the article specifying information of the pickup target article in the image captured by the imaging unit;
a laser beam output unit that outputs a visible laser beam; and
a position presenting unit that visually presents the position of the pickup target article to a pickup operator on the basis of the acquired position information of the pickup target article by irradiating the pickup target article with the visible laser beam output from the laser beam output unit to cause the pickup operator to recognize that the pickup target article is to be picked up,
wherein when the article specifying information detecting unit does not detect the article specifying information of the pickup target article in the image captured by the imaging unit, the position presenting unit visually presents to the pickup operator by irradiating a location with the visible laser beam output from the laser beam output unit to cause the pickup operator to recognize that the pickup target article is not detected in the captured image.

8. A pickup method which is performed by a pickup system having an imaging unit, an article specifying information detecting unit, a position determining unit, an article information storage unit, a pickup information storage unit, a position information acquiring unit, a laser beam output unit, and a position presenting unit, the pickup method comprising:
capturing, by the imaging unit, an image;
detecting, by the article specifying information detecting unit, article specifying information which is information for specifying an article collected in an article collection site from the image captured by the imaging unit;
determining, by the position determining unit, a position of the article in the article collection site from the position of the article specifying information in the captured image when the article specifying information is detected;
storing, by the article information storage unit, to hold article information in which the detected article specifying information is correlated with position information indicating the determined position of the article;
reading, by the position information acquiring unit, the article specifying information of a pickup target article from the pickup information storage unit;
acquiring, by the position information acquiring unit, the position information of the pickup target article corresponding to the read article specifying information of the pickup target article from the article information stored in the article information storage unit, when the article specifying information of the pickup target article is detected by the article specifying information detecting unit in the image captured by the imaging unit;
outputting, by the laser beam output unit, a visible laser beam; and
presenting, by the position presenting unit, visually the position of the pickup target article to a pickup operator on the basis of the acquired position information of the pickup target article, by irradiating the pickup target article with the visible laser beam output from the laser beam output unit to cause the pickup operator to recognize that the pickup target article is to be picked up,
wherein when the position of the article specifying information in the captured image departs from a predetermined area in the captured image, the presenting step presents the position of the pickup target article to the pickup operator by drawing a figure or a character indicating the position and the direction of the pickup target article with the visible laser beam instead of irradiating the pickup target article with the visible laser beam.

9. A pickup system comprising:
an imaging unit that captures an image;

an article specifying information detecting unit that detects article specifying information which is information for specifying articles collected in an article collection site from the image captured by the imaging unit;

a position determining unit that determines a position of an article in the article collection site from the position of the article specifying information in the captured image when the article specifying information is detected;

an article information storage unit that stores article information in which the detected article specifying information is correlated with position information indicating the determined the position of the article;

a pickup information storage unit that stores the article specifying information of a pickup target article;

a position information acquiring unit that acquires the position information of the pickup target article corresponding to the article specifying information of the pickup target article from the article information stored in the article information storage unit;

a position presenting unit that visually presents the position of the pickup target article to a pickup operator on the basis of the acquired position information so as to cause the pickup operator to recognize that the pickup target article is to be picked up;

a laser beam output unit that outputs a visible laser beam; and a position presenting unit that visually presents the position of the pickup target article to a pickup operator on the basis of the acquired position information of the pickup target article by irradiating the pickup target article with the visible laser beam output from the laser beam output unit to cause the pickup operator to recognize that the pickup target article is to be picked up, wherein when the position of the article specifying information in the captured image departs from a predetermined area in the captured image, the position presenting unit presents the position of the pickup target article to the pickup operator by drawing a figure or a character indicating the position and the direction of the pickup target article with the visible laser beam instead of irradiating the pickup target article with the visible laser beam.

* * * * *